United States Patent [19]

Okuda et al.

[11] Patent Number: 5,330,661
[45] Date of Patent: Jul. 19, 1994

[54] PROCESS AND APPARATUS FOR THE DECOMPOSITION OF ORGANOCHLORINE SOLVENT CONTAINED IN WATER

[75] Inventors: Taneaki Okuda; Kazuo Tateishi, both of Tokyo, Japan

[73] Assignee: NEC Corporation, Japan

[21] Appl. No.: 885,673

[22] Filed: Aug. 17, 1992

[30] Foreign Application Priority Data

Oct. 18, 1991 [JP] Japan .................. 3-298163

[51] Int. Cl.$^5$ .............................. C02F 1/32
[52] U.S. Cl. .................... 210/748; 210/763
[58] Field of Search .............. 210/748, 760, 763

[56] References Cited

U.S. PATENT DOCUMENTS

| | | | |
|---|---|---|---|
| 4,849,114 | 7/1989 | Zeff et al. | 210/748 |
| 4,861,484 | 8/1989 | Lichtin et al. | 240/748 |
| 4,863,608 | 9/1989 | Kawai et al. | 210/763 |
| 5,032,241 | 7/1991 | Robertson et al. | 210/748 |
| 5,035,784 | 7/1991 | Anderson et al. | 210/748 |
| 5,192,452 | 3/1993 | Mitsui et al. | 210/763 |

OTHER PUBLICATIONS

"Advanced Oxidation Processes for Treating Groundwater Contaminated With TCE and PCE: Pilot-Scale Elevations", Aieta, et al., AWWA Journal, pp. 64–72, May 1988.

"Advanced Oxidation Processes for Treating Groundwater Contaminated With TCE and PCE: Laboratory Studies", Glaze, et al., May 1988, pp. 57–63.

"The Chemistry of Water Treatment Processes Involving Ozone, Hydrogen Peroxide and Ultraviolet Radiation", Glaze, et al., Ozone Science and Engineering, vol. 9, pp. 335–352, 1987—International Ozone Association.

"Heterogeneous Photocatalysis: Degradation of Dilute Solutions of Dichloromethane ($CH_2Cl_2$), Chloroform ($CHCl_3$), and Carbon Tetrachloride ($CCl_4$) with Illuminated $TiO_2$ Photocatalyst" Hsiao, et al., Journal of Catalysis 82, pp. 418–423, Feb. 1983.

"Photoassisted Heterogeneous Catalysis: The Degradation of Trichloroethylene in Water", Pruden, et al. Journal of Catalysis 82, pp. 404–417, Feb. 1983.

"Degradation of Chloroform by Photoassisted Heterogeneous Catalysis in Dilute Aqueous Suspensions of Titanium Dioxide" Environ. Sci. Tech. 1983 pp. 626–631.

"Decomposition of Ozone in Water: Rate of Initiation by Hydroxide Ions and Hydrogen Peroxide", Staehelin, et al., Environ. Sci. Technol. 1982, pp. 676–681.

"Removal of Organic Micropollutants from Contaminated Groundwater by Oxidation and Stripping" Simovic, et al., Water Poll. Res. J. Canada, vol. 22, No. 1, 1987 pp. 187–196.

"Ultraviolet-Enhanced Ozonation of Organic Compounds: 1,2-Dichloroethane and Trichloroethylene as Model Substrates", Masten, et al., Ozone Science & Engineering, vol. 8, pp. 339–353, 1986.

"Chain Reaction in Aqueous Solutions Containing Ozone, Hydrogen Peroxide and Acid", Taube, et al., Dec. 1940, pp. 3357–3373.

"Effect of a Subsurface Sediment on Hydrolysis of Haloalkanes and Epoxides" Haag, et al. Environ. Sci. Technol. 1988, 22, pp. 658–663.

Publication from The Chemical Society of Japan, pp. 970–975, Copyright 1985 dated Aug. 23, 1984.

Primary Examiner—Neil McCarthy
Attorney, Agent, or Firm—Laff, Whitesel, Conte & Saret

[57] ABSTRACT

An organochlorine solvent contained in water is decomposed by adding at least one of hydrogen peroxide and ozone to the water and then radiating ultraviolet rays to the water. According to the invention, a catalytic amount of a water-insoluble barium titanate substance is caused to co-exist in the water.

4 Claims, 3 Drawing Sheets

DECOMPOSITION OF ORGANOCHLORINE SOLVENTS

DECOMPOSITION OF ORGANOCHLORINE SOLVENTS

PROCESS AND APPARATUS FOR THE DECOMPOSITION OF ORGANOCHLORINE SOLVENT CONTAINED IN WATER

BACKGROUND OF THE INVENTION

1) Field of the Invention

This invention relates to a process and apparatus for treating water—such as underground water, drinking water or effluent—contaminated with a toxic organochlorine solvent such as chloroform, trichloroethylene, tetrachloroethylene or methylchloroform so as to decompose the organochlorine solvent contained in the water.

2) Description of the Prior Art

For the purification of water contaminated with trichloroethylene out of organochlorine solvents, there are various known processes such as aeration, adsorption on activated carbon, decomposition by the Fenton's reagent, oxidative decomposition by hydrogen peroxide, oxidative decomposition by ozone, oxidative decomposition by both ozone and hydrogen peroxide, decomposition by illumination of ultraviolet rays, and decomposition by ultraviolet rays in the co-existence of ozone and hydrogen peroxide.

These processes, however, have not been systematically studied with respect to organochlorine solvents other than trichloroethylene. Further, there is practically no report on the decomposition of methylchloroform contained in water.

The aeration process comprises blowing a great deal of air into water to drive out any high-volatility organochlorine solvent or solvents into the atmosphere, so that it involves the potential danger that a new problem of environmental pollution may arise.

The activated carbon adsorption process eliminates organochlorine solvent or solvents from contaminated water by simply adsorbing the solvent or solvents on activated carbon. An additional process is therefore required for the decomposition of the organochlorine solvent or solvents.

The decomposition process making use of the Fenton's reagent employs ferrous and ferric salts in large amounts, resulting in the occurrence of sludge. Disposal of the sludge is cumbersome.

It is also known to decompose chloroform and/or trichloroethylene, which is contained in water, in the presence of titanium oxide as a photo-oxidative catalyst (J. of Catalysis, 82, 418-423, 1983; J. of Catalysis, 82, 404-417, 1983; Environ. Sci. Technol., 17(10), 628-631, 1983). Titanium oxide employed in these processes is not a ferroelectric substance. Moreover, these processes use neither ozone nor hydrogen peroxide and the decomposition velocity of such organochlorine solvents is slow.

The remaining processes are all accompanied by the problems that the efficiency of decomposition of organochlorine solvents is poor and the operation cost is high.

Further, there is no known process for the efficient decomposition of methylchloroform contained in water.

SUMMARY OF THE INVENTION

An object of this invention is to provide an process and apparatus for decomposing at an increased velocity various organochlorine solvents contained in water so that these solvents can be effectively eliminated.

Hydrogen peroxide produces active hydroxyl radicals when it absorbs ultraviolet rays in water. If ozone is also present at this time, the production of hydroxyl radicals is promoted and, further, active oxygen is also produced. In water containing organochlorine solvents, these active radicals are considered to oxidatively decompose such organochlorine solvents.

The present inventors were interested in the fact that organochlorine solvents such as trichloroethylene, methylchloroform and chloroform have relatively low solubility in water and have a relatively large dipole moment. A ferroelectric substance undergoes spontaneous polarization so that the substance has both positive and negative charges on its surface. When solvent molecules having a large dipole moment approach such a ferroelectric substance, they are firmly adsorbed on the ferroelectric substrate and hence concentrated on the surface of the ferroelectric substance. Radiation of ultraviolet rays on the so-concentrated solvent molecules was therefore expected to promote the decomposition reactions of the solvents.

According to the present invention, such oxidative decomposition reactions can be promoted to a substantial extent by the co-existence of a ferroelectric substance, which acts to adsorb and concentrate such organochlorine solvents at a high concentration on the surface thereof, in a reactor without inhibition of radiation by ultraviolet rays.

However, it has not been elucidated to date why the present invention is also effective for the decomposition of tetrachloroethylene which does not have any dipole moment.

To achieve the above object, the present invention provides, in one aspect, a process for decomposing an organochlorine solvent contained in water by adding at least one of hydrogen peroxide and ozone to the water and radiating ultraviolet rays to the water, which comprises causing a water-insoluble ferroelectric substance to co-exist in the water.

In another aspect of the present invention, there is also provided an apparatus for decomposing an organochlorine solvent contained in water by adding at least one of hydrogen peroxide and ozone to the water and radiating ultraviolet rays to the water, which comprises a decomposition treatment unit and a water-insoluble ferroelectric substance packed in said unit.

In a further aspect of this invention, there is also provided an apparatus for decomposing an organochlorine solvent contained in water, said apparatus having a vessel and an ultraviolet ray source and cylindrical filter, both arranged within said vessel, wherein:

said vessel is in the form of a cylinder having an outlet and an inlet for the water, and is adapted to be filled with the water or to permit flow of the water therethrough;

said ultraviolet ray source is arranged along an axis of said vessel and is adapted to radiate ultraviolet rays to the water inside said vessel; and said cylindrical filter is formed of a ferroelectric substance, surrounds said ultraviolet ray source, and is arranged in a flow path of the water between said inlet and said outlet of said vessel.

In a still further aspect of this invention, there is also provided an apparatus for decomposing an organochlorine solvent contained in water, said apparatus having an oval cylinder, an ultraviolet ray source and an ultraviolet-ray-transmitting column, wherein:

said oval cylinder is provided with an ultraviolet ray reflector on an inner wall thereof;

said ultraviolet ray source is arranged along one of focal axes of said oval cylinder and is adapted to radiate ultraviolet rays to the water within said ultraviolet-ray-transmitting column; and said ultraviolet-ray-transmitting column is internally packed with a particulate ferroelectric substance, has an outlet and an inlet for the water at opposite ends thereof, respectively, and is arranged along the other focal axis of said oval cylinder.

The present invention has the marked advantages that the organochlorine solvent can be decomposed at a high level of efficiency without environmental contamination and, as the addition of the ferroelectric substance is only required upon decomposition of the organochlorine solvent, the process and apparatus of the present invention can be easily practiced.

DETAILED DESCRIPTION OF THE INVENTION

Figure 1:
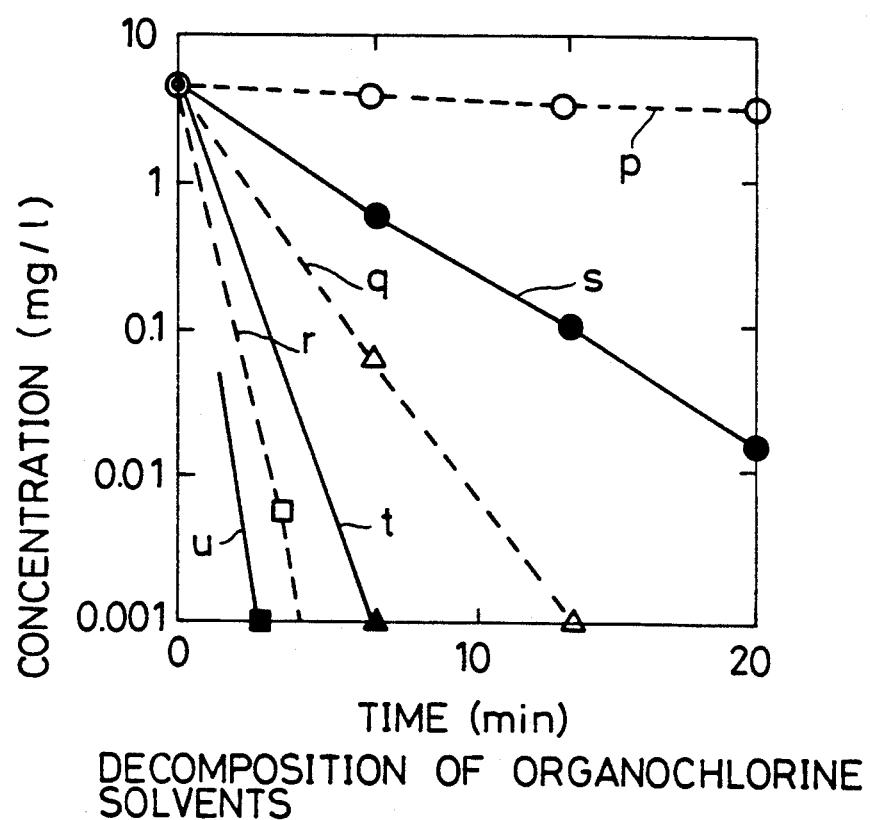
FIG. 1 is a diagram showing influence of a ferroelectric substance to the decomposition of organochlorine solvents.

According to the present invention, a water-insoluble ferroelectric substance is caused to exist in water contaminated with an organochlorine solvent when hydrogen peroxide and/or ozone is added to the water and ultraviolet rays are then radiated to the water to eventually decompose the organochlorine solvent into carbon dioxide, water, hydrochloric acid, etc.

Examples of organochlorine solvents which can be decomposed by the present invention include organochlorine solvents having one carbon atom, such as chloroform and methylene chloride; and organochlorine solvents having two carbon atoms, such as methylchloroform, trichloroethylene, tetrachloroethylene, 1,1-dichloroethylene, cis-1,2-dichloroethylene and trans-1,2-dichloroethylene.

In the present invention, each organochlorine solvent is either dissolved or dispersed in water and the water may contain one or more of surfactants, other solvents, various salts and the like.

No particular limitation is imposed on the concentration of each organochlorine solvent in water. The present invention can successfully treat water containing the organochlorine solvent at a concentration as high as several wt. % to water containing it at a concentration on the order of $\mu g/l$ or less.

As hydrogen peroxide and/or ozone employed in the present invention, those available by conventional processes can be used as they are.

The amount of hydrogen peroxide and/or ozone to be added varies depending on the co-existent chemical substances. Hydrogen peroxide and/or ozone must, however, be added in an amount required for the complete decomposition of the organochlorine solvent, namely, in an amount as much as 2-100 times, preferably 5-50 times the chemical equivalent of the organochlorine solvent. Hydrogen peroxide and/or ozone may be added at once or in portions.

The water-insoluble ferroelectric substance usable in the present invention can be selected from the group consisting of lead, barium, strontium, calcium, lanthanide metals, cadmium titanate, niobate and zirconate, and solid solutions of the titanate, niobate and zirconate. As an alternative, these ferroelectric substances can be used in any desired combination. In general, use of barium titanate is convenient. The ferroelectric substance may be either in a powder form or in a porous ceramic form and may be formed into various shapes.

Ultraviolet rays employed in this invention preferably contain rays in a wavelength range of from 180 nm to 350 nm. These ultraviolet rays can be obtained by a low-pressure mercury lamp or the like. A suitable radiation intensity of ultraviolet rays should be chosen in view of the amount of water to be treated, the treatment time, and the like.

The water-insoluble ferroelectric substance must be caused to co-exist when the organochlorine solvent is decomposed by adding hydrogen peroxide and/or ozone to contaminated water and ultraviolet rays are radiated thereto. In the simplest manner, this can be realized by adding hydrogen peroxide and/or ozone in an necessary amount to the contaminated water, adding and dispersing powder of the ferroelectric substance, and then radiating ultraviolet rays to the resultant mixture or filtering the resultant mixture under exposure to ultraviolet rays. The concentration of the powder so added may be chosen from a range of from 0.01 wt. % to 1 wt. % based on the contaminated water.

Figure 2A:
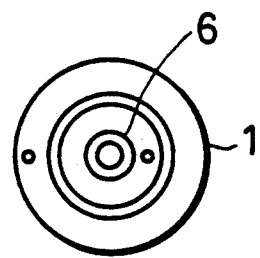
FIG. 2(a) is a schematic top plan view of an apparatus according to one embodiment of the present invention.
Figure 2B:
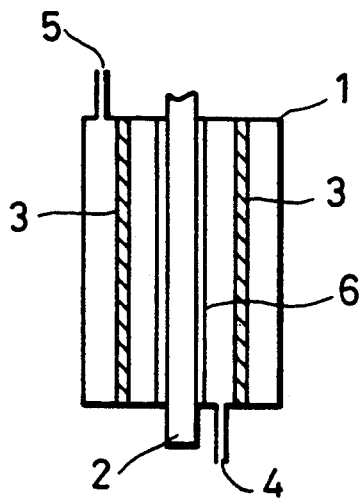
FIG. 2(b) is a schematic cross-sectional elevation of the apparatus.

In another manner, this can also be realized by an apparatus in which, as shown in FIGS. 2(a) and 2(b), an ultraviolet ray source 2 is arranged along an axis of a cylindrical vessel 1, the ultraviolet ray source 2 is surrounded by a cylindrical filter 3 made of a porous ferroelectric substance, and an outlet 5 for treated water and an inlet 4 for water to be treated are provided at upper and lower ends of the vessel 1 and outside and inside the cylindrical filter 3, respectively. In this manner, water which has been added with hydrogen peroxide and/or ozone and is to be treated is charged into the vessel 1 through the inlet 4, is caused to flow through the filter 3 and is then allowed to flow out through the outlet 5. While the water flows through the vessel 1, ultraviolet rays are radiated to the water so that any organochlorine solvent or solvents are decomposed. Designated at numeral 6 in FIGS. 2(a) and 2(b) is an inner cylinder of the vessel 1 made of quartz glass, which inner cylinder 6 permits transmission of ultraviolet rays therethrough. The cylindrical filter 3 may be formed of a porous ferroelectric ceramic or compact.

Figure 3A:
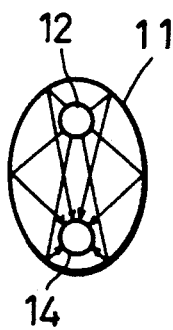
FIG. 3(a) is a schematic front elevation of an apparatus according to another embodiment of the present invention.
Figure 3B:
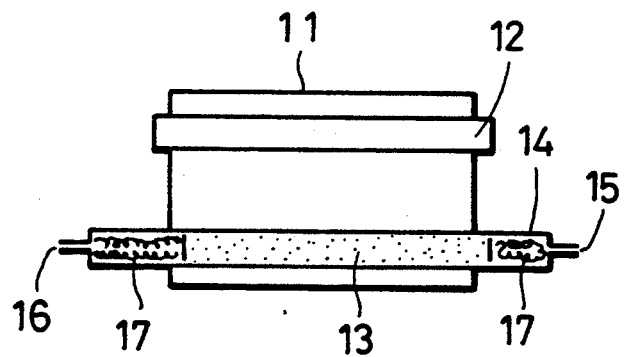
FIG. 3(b) is a schematic side elevation of the apparatus.

In a further manner, this can also be realized by an apparatus in which, as shown in FIGS. 3(a), and 3(b), an ultraviolet ray source 12 is arranged along one of focal axes of an oval cylinder 11 having an ultraviolet reflector on the inner wall thereof and an ultraviolet-ray-transmitting column 14 filled with a particulate ferroelectric substance 13 is disposed along the other focal axis. In FIGS. 3(a) and 3(b), there are also shown an inlet 15 for water to be treated, an outlet 16 for treated water, and glass wool 17 for sealing the particulate ferroelectric substance.

Water to be treated, which has been charged into the column 14 through the inlet 15, is brought into contact with the particulate ferroelectric substance 13 within the column 14 and is exposed to ultraviolet rays radiated through the entire outer circumferential wall of the column, whereby any organochlorine solvent or solvents is decomposed.

According to the present invention, any organochlorine solvent or solvents can be efficiently decomposed and eventually converted to carbon dioxide, water, hydrogen chloride, etc. This process is especially effective for the decomposition of methylchloroform. To eliminate hydrogen peroxide or ozone added in excess, it is merely necessary to treat the water, which has been treated in accordance with the present invention, with activated carbon in a manner known per se in the art.

Where it is necessary to eliminate a decomposition product, such as formic acid and hydrogen chloride, of an organochlorine solvent, treatment by an ion exchange resin can be added.

The present invention will next be described specifically by the following examples.

EXAMPLES 1-11

Figure 4:
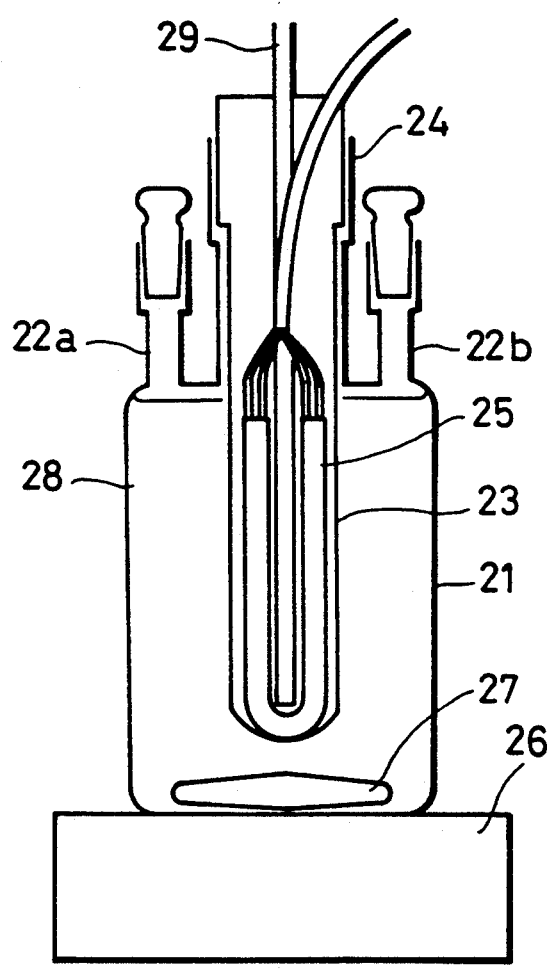
FIG. 4 is a schematic cross-sectional elevation of an apparatus according to a further embodiment of the present invention.

FIG. 4 illustrates a batch reactor used in each example of the present invention, in which numeral 21 indicates a reaction vessel having an internal capacity of about 1 l. The reaction vessel 21 has two sampling ports 22a, 22b, which are each fitted with a ground-in stopper, and an air-tight ground portion 24. The air-tight ground portion 24 supports an ultraviolet-ray-transmitting inner cylinder 23 made of quartz glass.

The inner cylinder 23 extends in the reaction vessel 21 and a 6 W low-pressure mercury lamp 25 of the titanate powder ("HBT-I Type" trade name; average particle size: 1.5 μm; product of Fuji Titanium Industry Co., Ltd.) as a ferroelectric substance and also in the absence of the barium titanate powder. The concentrations of those organochlorine solvents were measured in both the cases. The results are diagrammatically shown in FIG. 1.

In FIG. 1, lines p, q and r represent variations in concentration of methylchloroform, tetrachloroethylene and trichloroethylene in their water samples when barium titanate was not added. Lines s, t and u show variations in concentration when barium titanate was caused to co-exist at a concentration of about 0.5 g/l. The effects of the co-existence of barium titanate as a ferroelectric substance are evident from FIG. 1. By the co-existence of barium titanate, the decomposition velocities of those organochlorine solvents were accelerated twofold to tenfold.

Table 1 presents the results of similar experiments which were conducted as examples of this invention under various conditions while using the apparatus shown in FIG. 4. Using an ozone water containing 200 mg/l of ozone, ozone was added to water samples to be treated. The concentration of each solvent was measured by gas chromatography. The concentrations are all expressed by mg/l.

From these results, the effectiveness of the present invention in which a ferroelectric substance is caused to co-exist is readily envisaged. It is also evident that the present invention is extremely effective for the decomposition of methylchloroform. $PbTi_{0.45}Zr_{0.55}O_3$ and $Ba_{0.9}Pb_{0.1}TiO_3$ have residual polarization as much as 4 times and 1.3 times barium titanate, respectively. They can therefore bring about high decomposition effects. They are however expensive. It is also necessary to pay attention upon operation because toxic lead is leached out depending on the quality of water to be treated.

TABLE 1

|  | Ferroelectric compound | Initial concentration (mg/l) $H_2O_2$ | $O_3$ | Organochlorine solvent | Treatment time (min) | Concentration of organochlorine (mg/l) Before treatment | After treatment |
| --- | --- | --- | --- | --- | --- | --- | --- |
| Comp. Ex. 1 | None | 200 | 20 | Methylchloroform | 6 | 20 | 15 |
| Ex. 1 | $BaTiO_3$ | 200 | 20 | " | 6 | 20 | 0.02 |
| Ex. 2 | " | 100 | 50 | " | 12 | 25 | 0.008 |
| Ex. 3 | " | 100 | 10 | " | 12 | 5 | 0.001> |
| Ex. 4 | " | 100 | 10 | Trichloroethylene | 3 | 50 | 0.002 |
| Ex. 5 | " | 100 | 20 | " | 6 | 30 | 0.001> |
| Ex. 6 | $Ba_{0.9}Pb_{0.1}TiO_3$ | 100 | 0 | Methylchloroform | 12 | 15 | 0.006 |
| Ex. 7 | " | 100 | 10 | " | 12 | 15 | 0.002 |
| Ex. 8 | " | 100 | 0 | Trichloroethylene | 3 | 20 | 0.001> |
| Ex. 9 | $PbTi_{0.45}Zr_{0.55}O_3$ | 100 | 10 | " | 6 | 20 | 0.001> |
| Ex. 10 | " | 200 | 0 | Methylchloroform | 12 | 5 | 0.001> |
| Ex. 11 | $BaTiO_3$ | 150 | 10 | Perchloroethylene | 10 | 25 | 0.001> |
| Comp. Ex. 2 | None | 150 | 10 | " | 10 | 20 | 0.02 |
| Comp. Ex. 3 | None | 100 | 10 | Trichloroethylene | 3 | 20 | 0.2 |

U-shaped tubular configuration is inserted within the inner tube 23. There are also illustrated a magnetic stirrer 26, on which the reaction vessel 21 is mounted, and a stirring rod 27 placed inside the reaction vessel 21. Designated at numeral 28 is water sample to be treated and 29 is an air feeder tube for coolant air, which is inserted in the inner tube 23.

Three types of water samples were employed, which had been prepared by adding methylchloroform, tetrachloroethylene and trichloroethylene to river water at a concentration of about 5 mg/l, respectively. Hydrogen peroxide was added at a concentration of 100 mg/l to those water samples. Their ultraviolet ray decomposition tests were conducted in the co-existence of barium

EXAMPLES 12-15

In each example, a decomposition experiment was conducted by the apparatus of this invention illustrated in FIGS. 3(a) and 3(b). The apparatus was constructed of an aluminum-made oval cylinder which was 300 mm in major axis, 200 mm in minor axis and 600 mm in length and had a reflector formed on an inner wall thereof. Along one of focal axes, a 40 W ultraviolet ray source 12 having an available emission length of 500 mm was arranged. Disposed along the other focal axis was a column 14 made of a quartz glass tube which was 15 mm in outer diameter and 600 mm in length and was packed with barium titanate particles of 30 mesh. The results are summarized in Table 2.

The interior of the apparatus was subjected to forced air cooling, and the sample water was fed at an hourly space velocity of 20 by a pump through the inlet of the column 14. For the sake of comparison, the results of similar experiments conducted without packing the column are also shown in Table 2.

As will become apparent from Table 2, the efficiency of decomposition of an organochlorine solvent in the co-existence of a ferroelectric substance is also significant in a continuous flow apparatus.

TABLE 2

| | Ferroelectric compound | Initial concentration (mg/l) $H_2O_2$ | $O_3$ | Organochlorine solvent | Concentration of organochlorine (mg/l) Before treatment | After treatment |
|---|---|---|---|---|---|---|
| Comp. Ex. 4 | None | 200 | — | Methylchloroform | 20 | 4 |
| Ex. 12 | $BaTiO_3$ | 200 | — | " | 20 | 0.01 |
| Ex. 13 | " | 100 | — | " | 25 | 0.01 |
| Ex. 14 | " | 100 | 10 | " | 5 | 0.001> |
| Comp. Ex. 5 | None | 100 | 10 | Trichloroethylene | 50 | 0.01 |
| Ex. 15 | $BaTiO_3$ | 100 | 10 | " | 30 | 0.001> |

What is claimed is:

1. A process for decomposing an organochlorine solvent contained in water, said water and solvent being in a container having a circumference, said process comprising the steps of: adding at least one of hydrogen peroxide and ozone to the water, the concentration of the hydrogen peroxide in said water being approximately 100–200 mg/l, and the ozone being present in a concentration of up to approximately 50 mg/l, and radiating ultraviolet rays into said water from all directions outside the entire circumference, which comprises causing a catalytic amount of a water-insoluble barium titanate to co-exist in the water.

2. The process of claim 1, wherein the organochlorine solvent is methylchloroform.

3. The process of claim 1 and the added step prior to said ultraviolet radiation of dispersing a barium titanate powder in said water and solvent, the concentration of said power being in the range of 0.01 wt % based on the contaminated water.

4. A process for decomposing an organochlorine solvent contained in water, said solvent and water being in a manner that it may be exposed to light from different angles, said process comprising the steps of:
    stirring said solvent and water;
    adding during said stirring of said solvent and water a water-insoluble barium titanate powder and at least one material taken from the group consisting of hydrogen peroxide, and ozone, said hydrogen peroxide having a concentration in said solvent and water in the order of 100–200 mg/l, said ozone present in a concentration in said solvent and water up to about 50 mg/l, and said water-insoluble barium titanate powder being present in an amount in the range of 0.01 wt % to 1 wt % based on the water containing the organochlorine solvent, and radiating ultraviolet light into said mixture of solvent, water, and added material from said different angles.

* * * * *